Patented Dec. 16, 1952

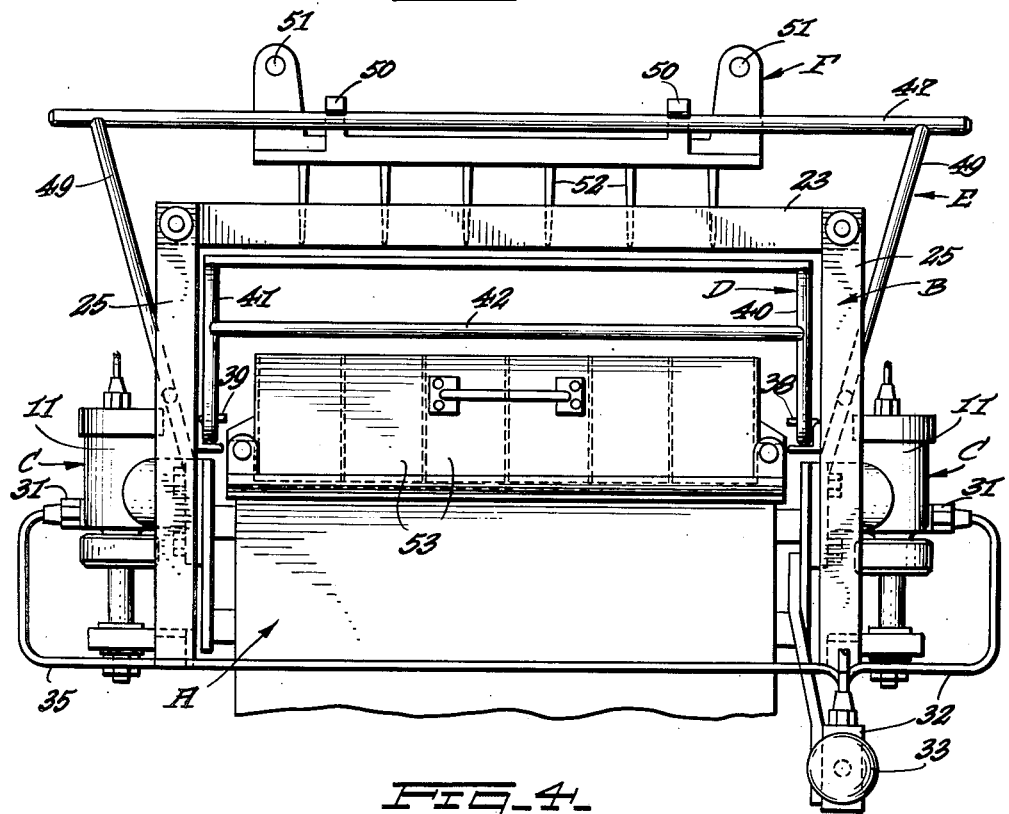
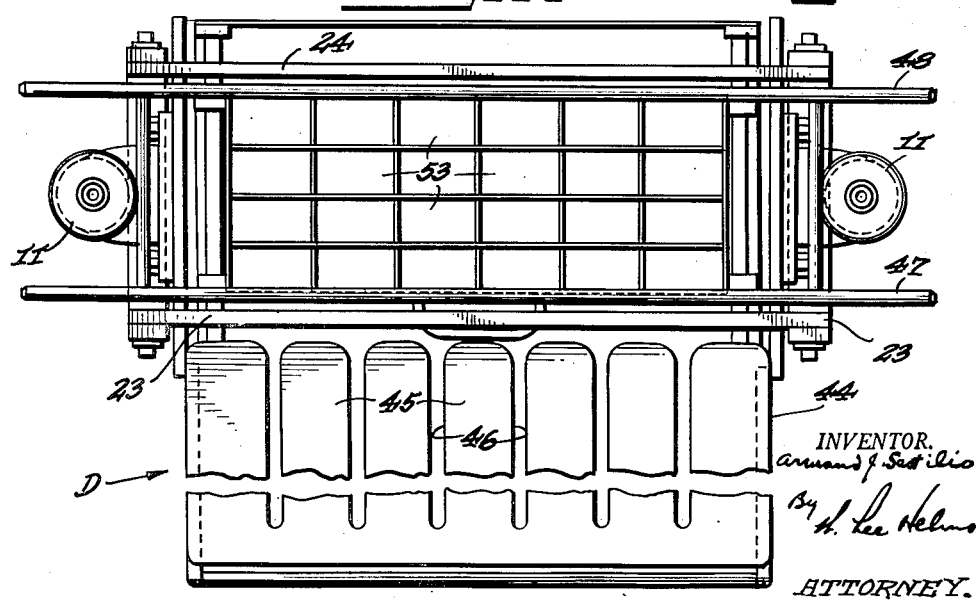

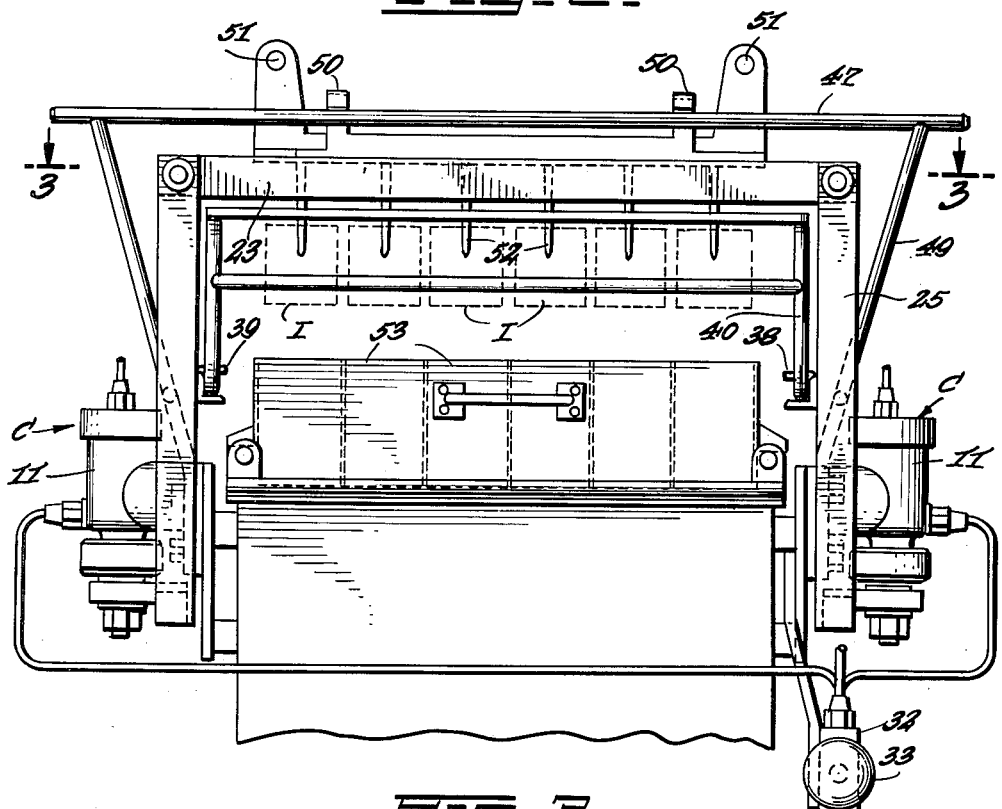
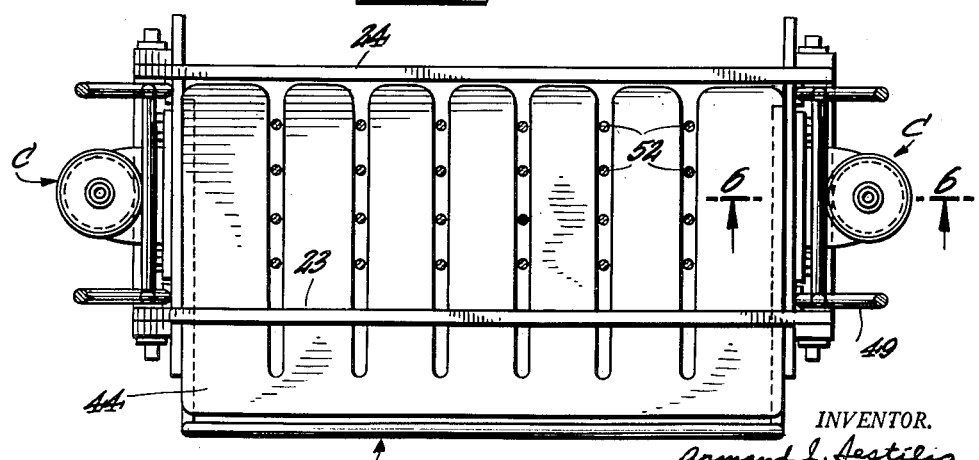

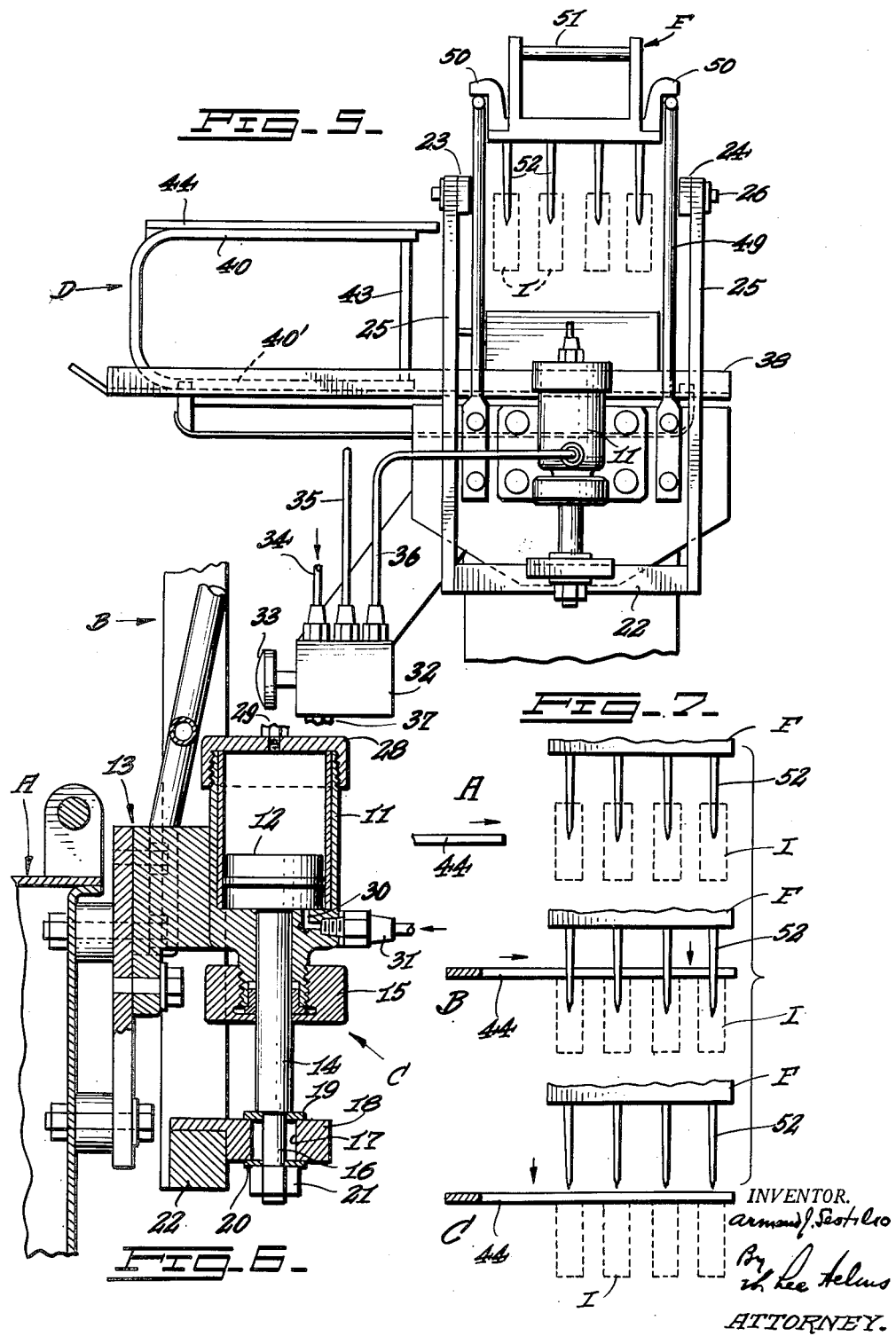

2,621,818

UNITED STATES PATENT OFFICE 2,621,818

APPARATUS FOR STRIPPING FOOD PRODUCTS FROM A SPUR PLATE

Armand J. Sestilio, Bloomfield, N. J., assignor to Eskimo Pie Corporation, Bloomfield, N. J., a corporation of Delaware Application January 25, 1951, Serial No. 207,771

3 Claims. (Cl. 214—310)

This invention relates to a stripping apparatus and more particularly to an apparatus for stripping food products such as ice cream bars from a spur plate having a plurality of downwardly extending spurs on which the bars are impaled.

During the manufacturing or processing of many types of food products, it is frequently found convenient to mount the food products on what is termed a spur plate so that a plurality of food products may be conveniently handled, transported and otherwise manipulated during the various processing operations. Such spur plates usually comprise a plurality of downwardly extending spurs of impaling elements on which the food products are impaled. However, the use of such spur plates presents a difficulty in that the food products must be removed therefrom after the processing operations have been completed, such removal operation being rendered particularly difficult in that the food products are mass produced at low cost and hence only a small amount of effort and expense per unit product can be expended for the stripping operation.

It is therefore a primary object of the present invention to provide a novel apparatus for quickly and economically stripping a plurality of food products such as ice cream bars from a spur plate on which the bars are impaled.

Briefly described, the specific embodiment of the invention shown in the drawings comprises a frame adapted to be moved upwardly or downwardly by hydraulic means and a stripper plate slidably mounted for horizontal movement with respect to the frame, the stripper plate having a plurality of spaced parallel horizontally extending finger elements each adapted to extend between a pair of adjacent rows of the spurs or impaling elements of the spur plate. The hydraulic means is actuated so as to move the frame to an upper position at which the stripper plate will be at an elevation above that of the ice cream bars impaled on the spur plate. The stripper plate is then moved horizontally toward the spur and each of the finger elements extend between a respective pair of adjacent rows of spurs. The hydraulic means is then actuated so as to move the frame downwardly, thereby also moving the stripper plate downwardly and enabling the finger elements of the stripper plates to engage the ice cream bars so as to force the latter downwardly and off the spurs, thereby completing the stripping operation. The next spur plate which is to be stripped is then moved into position and the cycle is repeated after the stripper plate is withdrawn horizontally back to its initial position so as to clear the spur plate during the upward movement of the frame.

It is to be understood that the specific embodiment of the invention shown in the drawings and described in more detail is intended to be merely illustrative of one of the many forms which the invention may take in practice and not as limiting the scope of the invention; the latter is delineated in the appended claims.

Referring now to the drawings:

Fig. 1 is a side elevational view of the apparatus with the movable or secondary frame in its lower position after the ice cream bars have been stripped from the spurs, the lower portion of the apparatus being broken away since it is conventional and does not form a part of the present invention;

Fig. 2 is a side elevational view similar to Fig. 1 but showing the secondary frame in the upper position before the ice cream bars are stripped, the bars being indicated by dotted lines;

Fig. 3 is a horizontal sectional view taken on the line 3—3 of Fig. 2;

Fig. 4 is a top plane view of the apparatus showing the stripper plate in its outer position before it has been moved horizontally inwardly so as to directly overlie the ice cream bars, the spur plate not being shown in this figure for purposes of greater clarity;

Fig. 5 is a side elevational view of the apparatus as seen from the right hand end of the previous figures;

Fig. 6 is a vertical sectional view taken on the line 6—6 of Fig. 3 and shows in detail the cylinder and piston arrangement for actuating the vertical reciprocal secondary frame; and Fig. 7 is a series of schematic views showing the successive relative positions of the stripper plate and the spurs during the stripping operation.

The apparatus comprises generally a stationary or primary frame A, a vertically reciprocal or secondary frame B, a pair of hydraulic means C for moving the secondary frame B upwardly or downwardly, a stripper plate slide D slideably mounted on the secondary frame B from horizontal reciprocal movement and a support E for suspending a spur plate F.

In more detail, and referring first to Fig. 6, each of the hydraulic means C comprises a cylinder 11 having a piston 12 vertically slideable therein. The cylinder 11 is fixedly secured to the stationary frame A by any suitable means such as the bracket and lug arrangement indicated generally at 13. A piston rod 14 extends downwardly from the piston 12 and through a conventional packing gland 15. The lower end of the piston rod 14 is provided with a reduced portion 16 which extends through a slot 17 formed in a bracket 18. A pair of washer plates 19, 20 are provided with aligned apertures through which the reduced portion 16 extends and the plates 19, 20 engage opposite surfaces of the bracket 18. The lower end of the reduced portion 16 of the piston rod 14 is threaded so as to receive a nut 21 which serves to retain the assembly comprising elements 16, 17, 18, 19 and 20 in fixed assembled relation.

The bracket 18 is secured by any suitable means to a horizontal member 22 of the secondary movable frame B. The latter comprises a pair of spaced parallel upper horizontal members 23, 24, as best seen in Figs. 1, 4 and 5, four vertical members 25, secured at their upper ends to the respective end of the horizontal members 23, 24 by bolts 26, and a pair of transverse lower horizontal members 22 secured to the lower ends of the vertical members 25 and each secured to a respective one of the piston rod 14 in the manner described above with respect to the member 22 as shown in detail in Fig. 6.

Each of the cylinders 11 is provided with a head 28 having an air vent 29 communicating between the interior of the cylinder 11 and the atmosphere so as to prevent pressure or vacuum above the piston 12 as the latter moves upwardly or downwardly. Each of the cylinders 11 is also provided with a port 30 communicating at one end of the interior of the cylinder 11 below the piston 12 and at its other end to a pipe coupling 31.

Referring now to Fig. 5, the reference numeral 32 indicates generally a conventional valve mechanism whose inner structural details are well known in the art and need not be described. The valve 32 is provided with a manually operable push button 33. A plurality of fluid conduits 34, 35 and 36 are connected to the valve 32. Conduit 34 is connected to a conventional means for supplying oil or other fluid under pressure, said means preferably being a pump (not shown). Conduit 35 extends from the valve 32 and is connected at its other end to the coupling 31 of the cylinder 11 at the left hand end of the apparatus as viewed in Fig. 1 and conduit 36 is similarly connected to the cylinder 11 located at the right hand end of the apparatus.

The push button 33 is normally biased to an outward position which prevents the fluid under pressure in the conduit 34 from flowing into conduits 35, 36. Also, at this outward position of the push button 33 the conduits 35, 36 are connected to a pressure relief discharge conduit 37 which discharges the fluid from the conduits 35, 36 back to the pump or other pressure supply source. When the push button 33 is placed inwardly or to the right as viewed in Fig. 5, the mechanism of the valve 32 is such that the fluid under pressure will flow from conduit 34 simultaneously into both conduit 35 and conduit 36, the pressure of the fluid in the latter conduits 35, 36 being equal.

The fluid then flows through the ports 30 and into the cylinder 11 so as to raise the pistons 12 to their uppermost position within cylinder 11. Since the movable or secondary frame B is connected to the piston rods 14, the frame B will also be moved upwardly, for a purpose to be described below. When it is desired to lower the secondary frame B, the push button 33 is pulled outwardly or to the left as shown in Fig. 5 so as to cut off the conduit 34 and its connecting conduits 35, 36 to the discharge conduit 37, thereby allowing the weight of the frame B to move the pistons 12 downwardly, the fluid beneath the pistons 12 flowing through the conduits 35, 36, 37 back to the pressure supply source.

As shown in Figs. 1 and 5, a horizontal transverse element 38 of U-shaped cross section is secured to intermediate portions of the right hand pair of vertical frame members 25 and projects forwardly therefrom or to the left as viewed in Fig. 5. A similar transverse U-shaped element 39 is secured to the left hand pair of vertical frame members 25 and extends parallel to the element 38. The stripper plate slide D comprises at each end a rod 40, 41 respectively, the rods 40, 41 being bent into a U-shaped configuration and connected by horizontal brace element 42. The upper ends of the U-shaped bars 40, 41 are connected to the respective lower ends thereof by vertical struts 43. The lower horizontal portions 40' of the bars 40, 41 extend within the channels of the U-shaped transverse elements 38, 39 and are slideable therein so as to enable the entire stripper plate slide D to be manually moved from the outward position shown in Fig. 5 horizontally inwardly to the inward position shown in Fig. 3.

A stripper plate 44 is secured to the upper horizontal portion of the slide D and comprises a plurality of inwardly projecting horizontally extending finger elements 45 arranged in spaced parallel relation so as to provide slots 46 therebetween, each of the slots 46 being adapted to receive a row of spurs of the spur plate to be described below.

The spur plate support E comprises a pair of longitudinal horizontal parallel rails 47, 48 mounted on upright supporting rods 49 which in turn are fixedly secured to the stationary frame A.

The spur plate F is of conventional construction and comprises hanger elements 50 adapted to rest upon the rails 47, 48 and a pair of transverse struts 51 which may be employed for manual handling for the spur plate F. At its lower horizontal surface the spur plate F is provided with a plurality of downwardly depending spurs or impaling elements 52 arranged in spaced rows as best seen in cross section in Fig. 3.

As best seen in Figs. 1 and 4, the reference numeral 53 indicates a plurality of chutes each mounted beneath a respective one of the spurs 52 and leading to a suitable packaging apparatus (not shown) where the ice cream bars or other food products may be bagged or otherwise packaged after being stripped from the spurs 52.

The operations of the apparatus will now be briefly described. A spur plate F having food products impaled on the spurs thereof is mounted on the rails 47, 48 directly over the chutes 53. The push button 33 is then actuated so as to cause fluid under pressure to flow from the conduit 34, through the valve 32, through conduits 35, 36 and into the cylinders 11 beneath the pistons 12 so as to raise the latter, thereby raising the secondary frame B from the lower position shown in Fig. 1 to the upper position shown in Fig. 2. The stripper plate slide D is then manually moved in a horizontal direction inwardly from the outer position shown in Fig. 4 to the inner position shown in Fig. 3. The finger elements 45 will thereby enter the spaces between respective adjacent rows of spurs 53, the latter extending within the slots 46 between the finger elements 45. The push button 33 is then pulled outwardly so as to reduce the fluid pressure beneath the pistons 12 and thereby allow the frame B to move downwardly due to its weight. As the frame B moves downwardly, the stripper plate 44 will also move downwardly so as to engage the upper ends of the ice cream bars or other fluid products indicated at I in Fig. 2. Continued downward movement of the stripper plate 44 causes the ice cream bars I to be stripped or slid downwardly from the spurs 53, each of the bars I then falling into a respective one of the chutes 53 from whence they are conveyed to the bagging or packaging machine. The stripper spur plate F is then removed and a loaded spur plate is substituted therefor. The stripper plate slide D is then moved outwardly back to the outer position shown in Fig. 4 and the push button 33 is depressed so as to repeat the cycle.

Having described my invention, what I claim and desire to secure by Letters Patent is as follows:

1. An apparatus for stripping food products from a spur plate having a plurality of downwardly extending spurs on which the food products are impaled, said apparatus comprising a primary frame, mounting means on the primary frame for supporting said spur plate, a secondary frame, a piston means for moving said secondary frame upwardly or downwardly as desired, a stripper plate, and parallel guideways adapted for slidably mounting said stripper plate on said secondary frame for horizontal movement, whereby said secondary frame may be first moved upwardly to bring said stripped plate to an elevation above the food products impaled on the spurs of said spur plate so that said stripper plate may then be moved horizontally to a position directly over said food products and said secondary frame and said stripper plate may then be moved downwardly so as to cause the stripper plate to strip the food products from the spurs.

2. An apparatus as recited in claim 1, wherein said piston means for moving said secondary frame upwardly comprises a cylinder connected to the primary frame, a piston reciprocally mounted therein, means connecting said piston to said secondary frame, fluid conduit means for introducing fluid under pressure to said cylinder to actuate said piston, and valve means for controlling the flow of fluid from said fluid conduit means to said cylinder.

3. An apparatus for stripping food products from a spur plate having a plurality of downwardly extending spurs on which the food products are impaled, said apparatus comprising a primary frame, mounting means on the primary frame for supporting said spur plate, a pair of cylinders spaced from each other and fixedly secured to said primary frame, a pair of pistons each vertically reciprocable within a respective one of said cylinders, a secondary frame, means securing said secondary frame to said pistons whereby the vertical position of the latter determines the vertical position of said secondary frame, a stripper plate slidably mounted on said secondary frame for horizontal reciprocal movement, said stripper plate comprising a plurality of spaced parallel horizontally extending finger elements each adapted to extend between a pair of adjacent rows of spurs of said spur plate, fluid conduit means for introducing fluid under equal pressure to said cylinders so as to actuate said pistons equally and simultaneously, and valve means for controlling the flow of fluid from said fluid conduit means to said cylinders, whereby said secondary frame may be first moved upwardly to bring said stripper plate to an elevation above the food products impaled on the spurs of said stripper plate and said stripper plate may then be moved horizontally to a position directly over said food products and said secondary frame and said stripper plate may then be moved downwardly so as to cause the stripper plate to strip the food products from the spurs.

ARMAND J. SESTILIO.

REFERENCES CITED

The following references are of record in the file of this patent:

UNITED STATES PATENTS

| Number | Name | Date |
| --- | --- | --- |
| 2,113,581 | Eddy | Apr. 12, 1938 |
| 2,303,013 | Wenzl, Jr. | Nov. 24, 1942 |